(12) United States Patent
Bala et al.

(10) Patent No.: US 12,483,981 B2
(45) Date of Patent: Nov. 25, 2025

(54) METHOD AND APPARATUS FOR NETWORK ENERGY SAVING STATE INDICATION

(71) Applicant: Rakuten Symphony, Inc., Tokyo (JP)

(72) Inventors: Erdem Bala, San Mateo, CA (US); Antonio Forenza, San Mateo, CA (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/008,584

(22) PCT Filed: Oct. 5, 2022

(86) PCT No.: PCT/US2022/045733
§ 371 (c)(1),
(2) Date: Dec. 6, 2022

(87) PCT Pub. No.: WO2024/025571
PCT Pub. Date: Feb. 1, 2024

(65) Prior Publication Data
US 2024/0244524 A1    Jul. 18, 2024

Related U.S. Application Data (60) Provisional application No. 63/393,455, filed on Jul. 29, 2022.

(51) Int. Cl.
*H04W 52/02* (2009.01)
(52) U.S. Cl.
CPC ... *H04W 52/0212* (2013.01); *H04W 52/0235* (2013.01)

(58) Field of Classification Search
CPC ......... H04W 52/0212; H04W 52/0235; H04W 52/0206; H04W 52/0229; H04W 52/0245;
(Continued)

(56) References Cited

U.S. PATENT DOCUMENTS

| 9,485,728 B1 | 11/2016 | Banerjea et al. |
| 2003/0086399 A1 | 5/2003 | Proctor, Jr. |

(Continued)

FOREIGN PATENT DOCUMENTS

| JP | 2015-61262 A | 3/2015 |
| WO | 2011/085238 A2 | 7/2011 |

OTHER PUBLICATIONS

International Search Report dated Feb. 22, 2023 issued in International Application No. PCT/US2022/045733.

(Continued)

*Primary Examiner* — Robert C Scheibel
(74) *Attorney, Agent, or Firm* — Sughrue Mion, PLLC (57) ABSTRACT

A method performed by at least one processor in a user equipment (UE) includes receiving one or more resources from a base station operating in a non-energy saving mode. The method further includes receiving, from the base station, control information including in a downlink control channel, the control information indicating whether the base station is operating in an energy saving mode. The method further includes determining, based on the control information, whether the base station is operating in the energy saving mode. The method further includes modifying the receiving of the one or more resources in response to a determination the base station is operating in the energy saving mode.

20 Claims, 7 Drawing Sheets

(58) Field of Classification Search
CPC ........... H04W 52/0258; H04W 52/028; H04W 52/0216; H04W 52/0025; H04W 76/27; H04W 72/232; Y02D 30/70; H04L 5/0053
See application file for complete search history.

(56) References Cited

U.S. PATENT DOCUMENTS

| | | | |
|---|---|---|---|
| 2012/0275335 A1 | 11/2012 | Huang | |
| 2020/0313743 A1 | 10/2020 | Park | |
| 2021/0266841 A1 | 8/2021 | Li et al. | |
| 2023/0077869 A1* | 3/2023 | Ly | H04W 74/006 370/311 |
| 2023/0189140 A1* | 6/2023 | Elshafie | H04W 72/21 370/311 |
| 2023/0309171 A1* | 9/2023 | Zhou | H04W 72/23 |
| 2024/0340790 A1* | 10/2024 | Zhou | H04W 52/0206 |
| 2025/0048259 A1* | 2/2025 | Liu | H04W 52/0258 |

OTHER PUBLICATIONS

Written Opinion dated Feb. 22, 2023 issued in International Application No. PCT/US2022/045733.

Fanny Parzysz et al., "Drastic Energy Reduction With gDTX in Low Cost 5G Networks", IEEE Access, 2018, vol. 6, pp. 58171-58181 (11 pages total).

Fatma Ezzahra Salem, "Management of Advanced Sleep Modes for Energy-Efficient 5G Networks", Doctoral thesis from the Institut Polytechnique de Paris, 2019, pp. 1-85 (99 pages total), Retrieved from the Internet: https://theses.hal.science/tel-02500618/document.

CATT, "Network Energy Saving techniques in time, frequency, and spatial domain", 3GPP TSG RAN WG1 #109-e, e-Meeting, May 9-20, 2022, R1-2203482, (8 pages total).

Translation of Office Action issued Aug. 5, 2025 in Japanese Application No. 2024-545116.

* cited by examiner

METHOD AND APPARATUS FOR NETWORK ENERGY SAVING STATE INDICATION

CROSS REFERENCE TO RELATED APPLICATIONS

This application is a National Stage of International Application No. PCT/US2022/045733 filed Oct. 5, 2022, claiming priority based on U.S. Provisional Application 63/393,455 filed Jul. 29, 2022.

TECHNICAL FIELD

The present disclosure relates generally to communication systems, and more particularly to methods and apparatuses for network energy saving state indication.

BACKGROUND

In prior specification releases (e.g., NR Rel-17), mechanisms for activation/deactivation of capacity booster cells have been specified (e.g., TS 28.310, TR 36.887, and TR 36.927). However, these solutions are limited to cell activation/deactivation and do not provide more dynamic ways for an gNB to enter sleep mode to save power. Accordingly, there is a need to achieve more efficient operation dynamically and/or semi-statically and finer granularity adaptation of transmissions and/or receptions in one or more of network energy saving techniques in time, frequency, spatial, and power domains, with potential support/feedback from UE, potential UE assistance information, and information exchange/coordination over network interfaces.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for network energy saving state indication are disclosed by the present disclosure.

According to an exemplary embodiment, a method performed by at least one processor in a user equipment (UE) includes receiving one or more resources from a base station operating in a non-energy saving mode. The method further includes receiving, from the base station, control information including in a downlink control channel, the control information indicating whether the base station is operating in an energy saving mode. The method further includes determining, based on the control information, whether the base station is operating in the energy saving mode. The method further includes modifying the receiving of the one or more resources in response to a determination the base station is operating in the energy saving mode.

According to an exemplary embodiment, a user equipment (UE) includes at least one memory configured to store computer program code, and at least one processor configured to access said at least one memory and operate as instructed by said computer program code. The computer program code includes first receiving code configured to cause at least one of said at least one processor to receive one or more resources from a base station operating in a non-energy saving mode. The computer program code includes second receiving code configured to cause at least one of said at least one processor to receive, from the base station, control information including in a downlink control channel, the control information indicating whether the base station is operating in an energy saving mode. The computer program code includes determining code configured to cause at least one of said at least one processor to determine, based on the control information, whether the base station is operating in the energy saving mode. The computer program code includes modifying code configured to cause at least one of said at least one processor to modify the receiving of the one or more resources in response to a determination the base station is operating in the energy saving mode.

According to an exemplary embodiment, a non-transitory computer readable medium having instructions stored therein, which when executed by a processor cause the processor to execute a method performed in a user equipment (UE). The method includes receiving one or more resources from a base station operating in a non-energy saving mode. The method further includes receiving, from the base station, control information including in a downlink control channel, the control information indicating whether the base station is operating in an energy saving mode. The method further includes determining, based on the control information, whether the base station is operating in the energy saving mode. The method further includes modifying the receiving of the one or more resources in response to a determination the base station is operating in the energy saving mode.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to providing indication of a gNB entering an energy saving mode. Particularly, a gNB may enter one of various sleep modes at a given time (e.g., deep sleep, light sleep, etc.). The gNB may further indicate dynamically the sleep modes to the UEs. The indication enables UEs to learn the state of operation of the gNB (e.g., gNB operating in a sleep mode) so that the UEs do not monitor certain channels or signals when the gNB is operating in a sleep mode. This indication may be provided to the UEs in control information in a downlink control channel. The determination of whether a base station is in one of a plurality of sleep modes may be based on one or more bits included in the control information, and a periodicity at which the control information is received. The embodiments of the present disclosure enable network energy savings so that operational costs and environmental impact of the network may be reduced.

Figure 1:
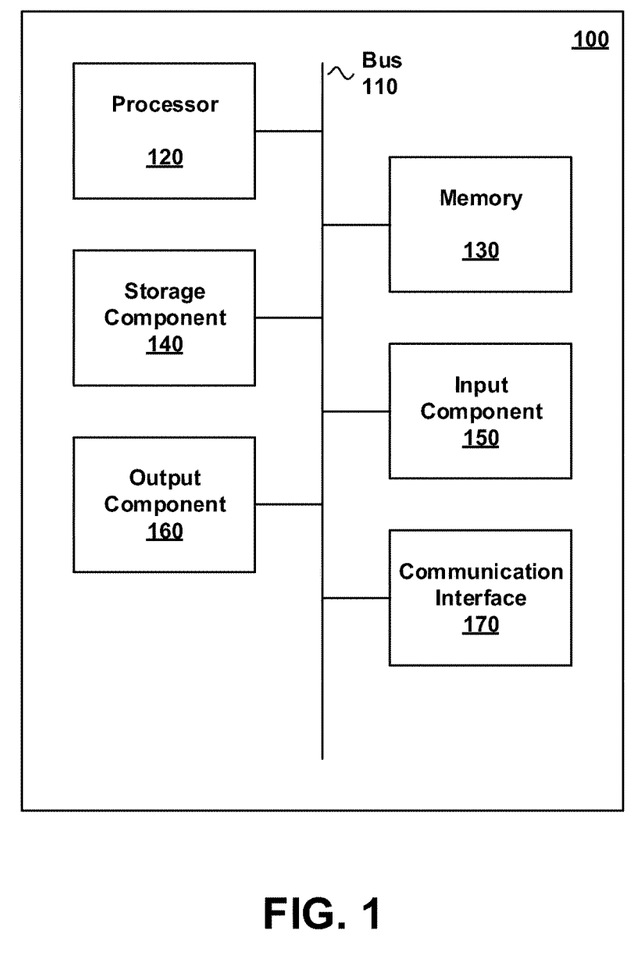
FIG. 1 is a diagram of an example network device in accordance with various embodiments of the present disclosure.

FIG. 1 is diagram of an example device for performing PRACH detection. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
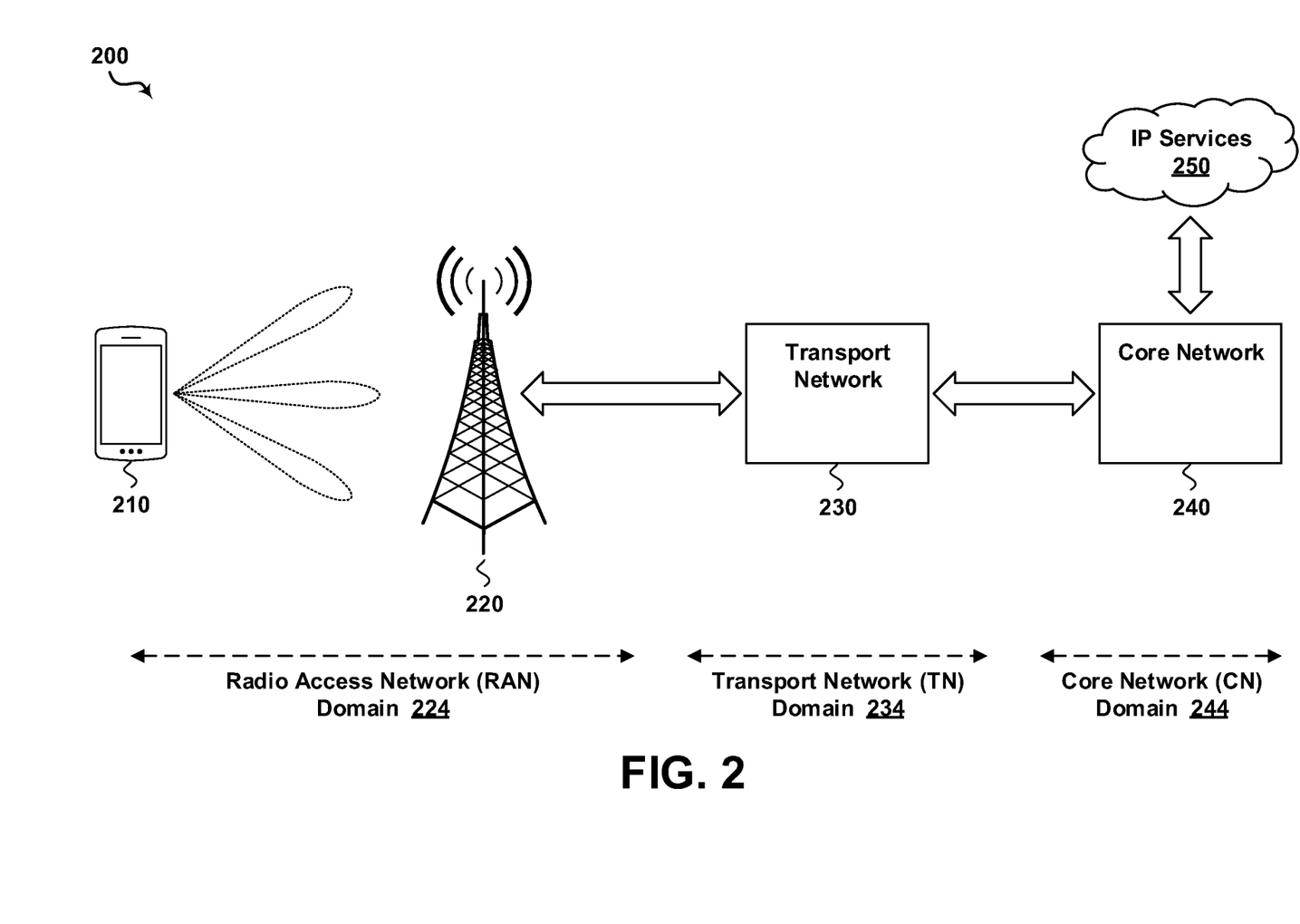
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macro-cells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

In some embodiments, a transmitter and/or a receiver may be associated with at least one energy saving state in a given time interval. The terms power saving and energy saving may be used interchangeably. An energy saving mode may be defined by how much energy a node (a node may refer to a transmitter and/or a receiver) may be consuming in that state. An energy saving mode may be defined by what parts of the baseband and RF components may be active while operating in the energy saving mode, and what parts of the baseband and RF components are in a sleep mode. The energy saving node may include a plurality of sleep modes.

A sleep mode may refer to a state in which at least certain RF and/or baseband components may be deactivated. For example, one energy saving state may be associated with a deep sleep mode while another energy saving mode may be associated with a micro sleep mode. In the micro sleep, most RF and baseband components may be active and certain transmit/receive operations may be stopped (e.g., no downlink data transmission). In the deep sleep mode, most RF and baseband components may be deactivated. In the light sleep mode, most RF components may be deactivated. In some embodiments, there is a one-to-one mapping between an energy saving state and a particular sleep mode.

In some embodiments, each sleep mode may be associated with certain transmission and/or receive characteristics. For example, in the deep sleep mode, the gNB may not transmit certain channels or and/or signals such as synchronization signal blocks (SSBs), remaining minimum system information (RMSI), channel state information reference signal (CSI-RS), etc. In the light sleep mode, for example, the gNB may be expected to transmit some common channels and signals such as SSBs with reduced periodicity.

The transmission characteristics for a sleep mode may be known by the receiver, for example through configuration, a MAC CE, LI signaling, or a combination. As an example, for a given sleep mode the UE may be provided an indication of one or more of the following parameters as a configuration: {SSBs ON or SSBs OFF: SSBs with full periodicity or SSBs with reduced periodicity: RMSI ON or RMSI OFF: Low overhead SSB ON or OFF, etc.}. Furthermore, the UE may be provided an indication of transmission parameters of CSI-RS, including ON or OFF, number of transmitted SSBs in a burst and their indices, etc.

The gNB may indicate dynamically to the UE, using LI signaling (e.g., Physical Downlink Control Channel (PDCCH)), the upcoming sleep mode(s), which may be valid over a duration. At least one of the following embodiments, and/or a combination thereof, may be used by the gNB and UE.

In some embodiments, the energy saving mode information may be indicated in control information (e.g., the downlink control information (DCI)). The DCI may be a scheduling DCI or a group common signaling DCI. A scheduling DCI may schedule data to and/or from a UE. A group common signaling DCI may not schedule data to and/or from a UE. At least one bit and/or a codepoint in the DCI may be allocated and/or used for the indication. For example, with a single bit, the gNB may indicate whether an upcoming sleep mode is the light sleep mode or deep sleep mode:

bit 0: gNB is going to enter light sleep mode
bit 1: gNB is going to enter deep sleep mode In some embodiments, there may be a delay between the time when the indication is received at the UE, and the time the indicated mode is applied and/or is assumed to be applicable. For example, the indication may be received in slot n and the UE may assume that the gNB is in the deep sleep mode starting from slot n+k, where both n and k may be integers. The UE may not expect transmission of certain channels and signals from the gNB starting from slot n+k.

The receiver may be configured with at least one search space to monitor the PDCCH to receive the indication. The monitoring may be performed in periodic monitoring occasions. In an example, the UE may be configured with two or more monitoring occasions with separate periodicities. These features may be achieved by configuring the UE with more than one search space and/or a search space with multiple periodicities. The following examples use two search spaces, but the embodiments may apply similarly apply to more general cases (e.g., three or more search spaces). Furthermore, the following examples use two sleep modes, but the disclosed embodiments are applicable to more general cases (e.g., three or more sleep modes). In some embodiments, there may be certain sleep modes the gNB may not indicate to the UE. For example, the gNB may enter a micro sleep mode when there is no scheduled data to transmit and/or receive.

In some embodiments, the indications received in the monitoring occasions, which may be monitored with separate periodicities, may be associated with a separate sleep mode (e.g., the indications may be used to activate and/or deactivate those associated sleep modes), and may not be applicable to sleep modes associated with other monitoring occasions. The UE may interpret the indications (e.g., bits and/or codepoints) based on the associated sleep mode. For example, the indication associated with the deep sleep mode may be transmitted every T1 ms (e.g., T1=100 ms), and the indication associated with the light sleep mode may be transmitted every T2 ms (e.g., T2=20 ms). As an example, a one-bit indication received in a monitoring occasion with T1 periodicity may indicate (1: activate deep sleep, 0: not activate deep sleep). In this regard, when the indicator is 1, the UE determines that the base station is in an energy saving mode, and since the indicator is received at the T1 interval, the UE determines the base station is entering the deep sleep mode. In this same example, a one-bit indication received in a monitoring occasion with T2 periodicity may indicate (1: activate light sleep, 0: not activate light sleep).

Figure 3:
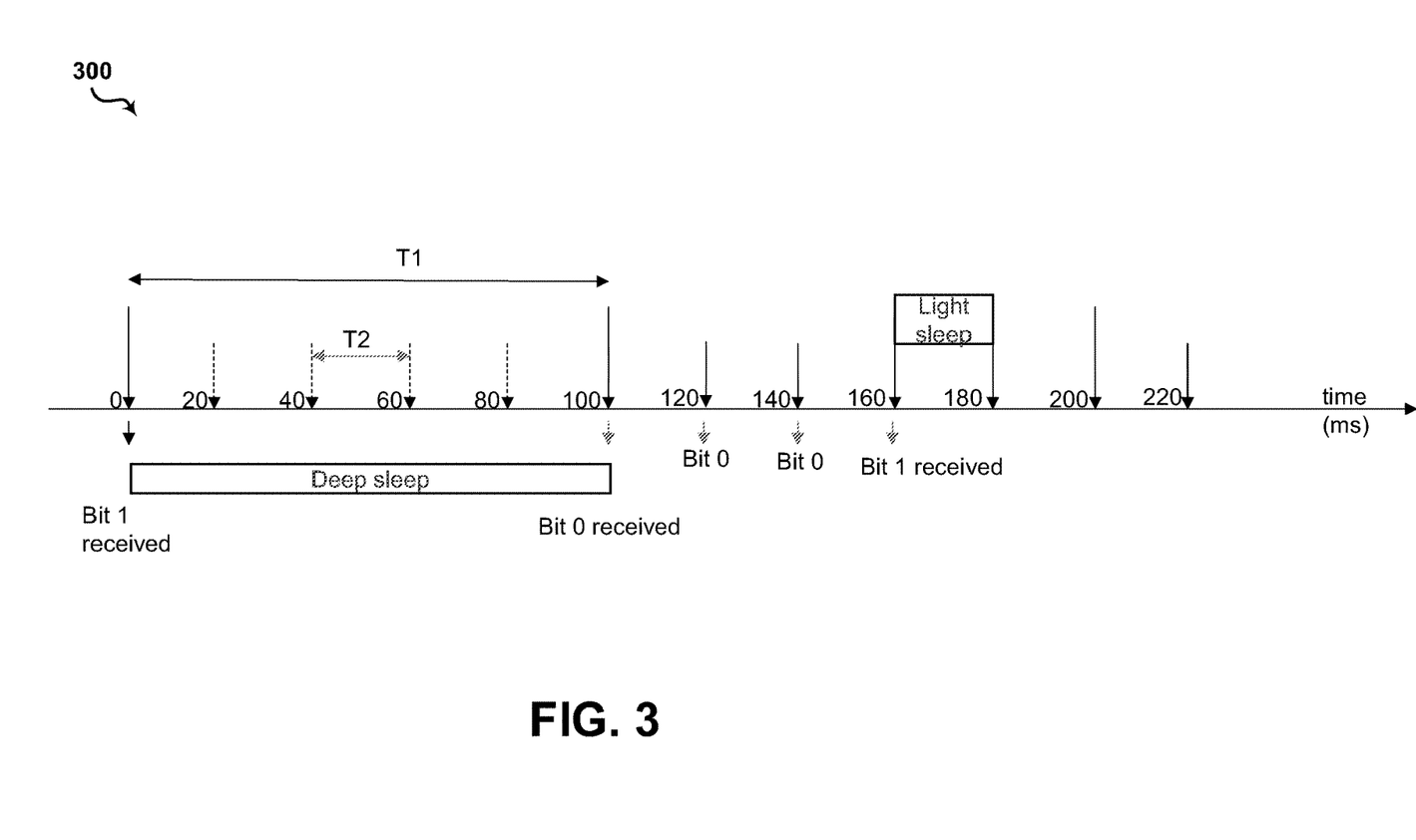
FIG. 3 is an example time sequence diagram, in accordance with various embodiments of the present disclosure.

FIG. 3 illustrates an example timeline 300 in which the base station is determined to be in one of a plurality of sleep modes based on a time of reception of an indicator. In FIG. 3, the UE monitors a first search space with 100 ms periodicity and a second search space with 20 ms periodicity. In a monitoring occasion of 100 ms periodicity (e.g., at time 0 ms) bit 1 is received, which indicates the base station is in an energy saving mode, and since bit 1 is received at 100 ms periodicity (e.g., 0 ms, 100 ms, 200 ms, etc.), the deep sleep mode is determined to be active. Since the deep sleep mode is activated, the subsequent four monitoring occasions with 20 ms periodicity are not monitored. In this regard, the subsequent monitoring occasions of a second search space with a second periodicity are skipped (e.g., not monitored). These monitoring occasions may be associated with another one of the plurality of sleep modes such as the light sleep mode.

In some embodiments, the activation and/or deactivation of a search space may be triggered by the contents of a PDCCH received in another search space. Alternatively, or in addition, certain monitoring occasions of a first search space may be activated and/or deactivated by the contents of a PDCCH received in the same or a second search space and with a different periodicity than the first search space. For example, at time 100 ms, the UE receives bit 0 that indicates deep sleep is not activated. Subsequently, the UE starts monitoring the PDCCH with 20 ms periodicity. The UE receiving bit 1 may indicate the light sleep mode is activated for 20 ms, and the UE receiving bit 0, may indicate the light sleep is not activated.

In some embodiments, if the monitoring occasions associated to different sleep modes overlap in time (e.g., at 0 ms, 100 ms, 200 ms), a predefined rule may be used regarding an interpretation of the indication. The indication may be used for the sleep mode with the larger periodicity or the sleep mode with larger power saving gain. For example, a bit 1 received at 100 ms falls within both the T1 periodicity (100 ms) for the deep sleep mode, and the T2 periodicity (20 ms) for the light sleep mode. Since the deep sleep mode has the larger periodicity than the light sleep mode, the UE may determine the base station is in the deep sleep mode rather than the light sleep mode based on the predefined rule.

A sleep mode may also refer to a discontinuous transmission (DTX). Multiple DTX cycles may be defined (e.g., long DTX cycle with 100 ms and short DTX cycle with 20 ms). Each DTX cycle may imply certain transmission and receive operations. For example, in the long DTX cycle, the gNB may not be expected to transmit any channel and/or signal. The UE may not monitor any channel and/or attempt to receive any signals. For example, in the short DTX cycle, the gNB may be expected to transmit some signals such as CSI-RS and the UE may be expected to receive those signals but not monitor any channel. If the long DTX cycle is activated, the short DTX cycle may not be expected to be activated. The DTX cycles may be expected to start at certain time instances only. The activation of a DTX cycle may be achieved with an indication in the PDCCH. In some embodiments, not more than one DTX cycle may be allowed to be active at a given time. The activation of a first DTX cycle may trigger deactivation of a second DTX cycle for a specific duration.

In some embodiments, the UE may be configured with a search space, and the UE may monitor monitoring occasions with the periodicity corresponding to the search space. For example, the UE may monitor with 20 ms periodicity. At a monitoring occasion, if received, the DCI may indicate which sleep mode will be activated. In these embodiments, the bit/codepoint may be mapped to a particular sleep mode. Furthermore, the duration of each sleep mode may be configured. The mapping of received bits/codepoints to a sleep mode and duration may be performed in accordance with the following examples:

Example 1 bit 0: gNB is going to enter light sleep mode (duration 20 ms)
bit 1: gNB is going to enter deep sleep mode (duration 100 ms)

Example 2 bits 00: gNB is going to enter light sleep mode (duration 20 ms)
bits 01: gNB is going to enter light sleep mode (duration 50 ms)
bits 10: gNB is going to enter deep sleep mode (duration 100 ms)
bits 11: gNB is going to enter deep sleep mode (duration 200 ms)

In some embodiments, one set of bits may indicate the sleep mode and another set of bits may indicate the duration. For example, with three bits, the first bit may indicate light or deep sleep: and the remaining two bits may choose one duration out of maximum of four durations for the indicated sleep mode as follows:
bits: 000: light sleep mode, 20 ms
bits: 010: light sleep mode, 40 ms
bits: 100: light sleep mode, 60 ms
bits: 110: light sleep mode, 80 ms bits: 001: deep sleep mode, 100 ms
bits: 011: deep sleep mode, 150 ms
bits: 101: deep sleep mode, 200 ms
bits: 111: deep sleep mode, 250 ms In this example, the least significant bit may be used to indicate the sleep mode. In another example, the most significant but may be used to indicate the sleep mode.

In some embodiments, if the PDCCH is not detected in a monitoring occasion, UE behavior may be predefined or configured. The UE may assume no sleep mode is indicated and may fall back to normal operation, or the UE may assume one of the sleep modes is indicated (e.g., the last indicated mode). In some embodiments, one bit and/or codepoint may be allocated to the regular operation (e.g., the bit/codepoint maps to normal operation without sleep mode). The normal operation may be a non-energy saving mode.

Figure 4:
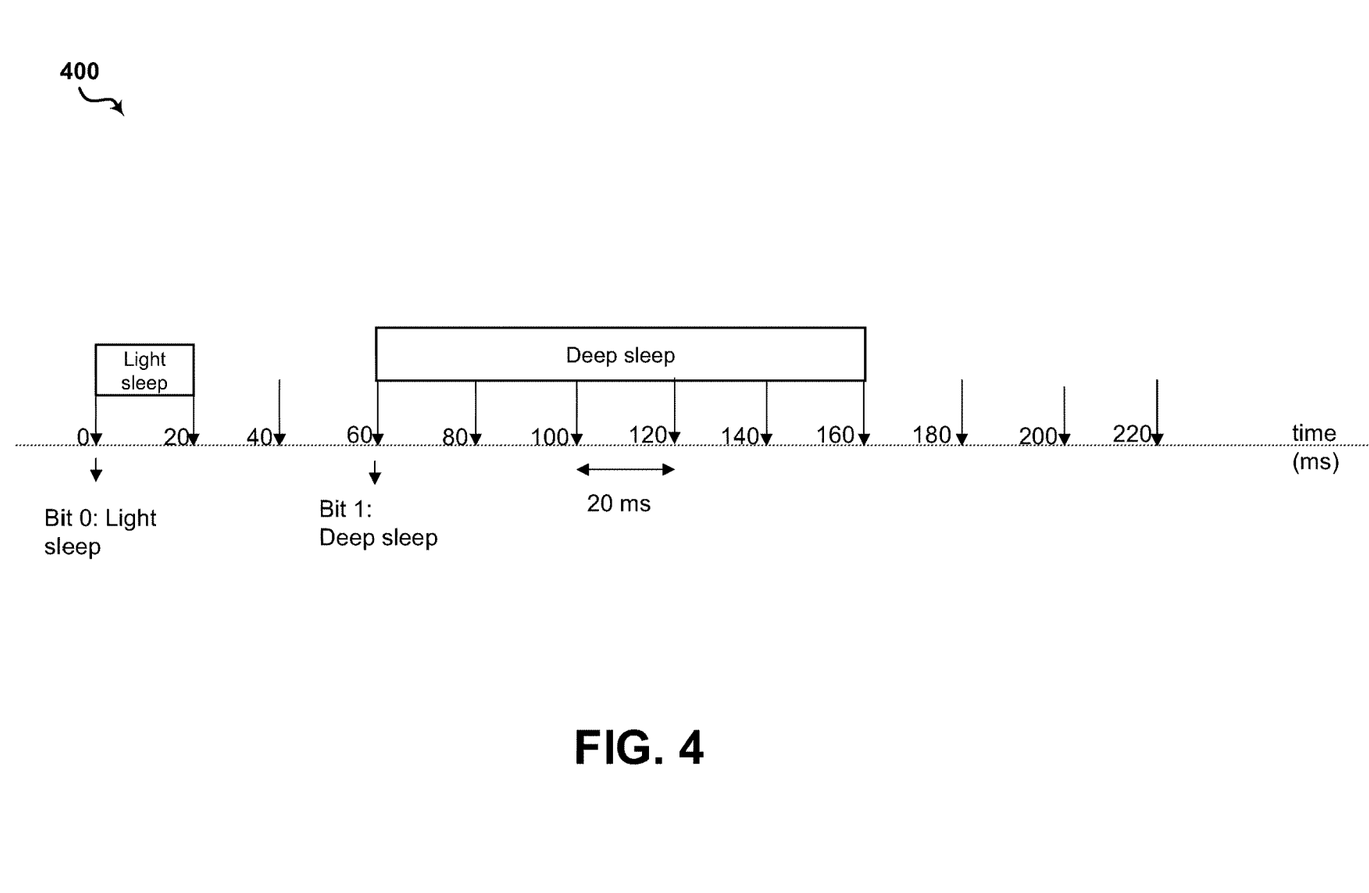
FIG. 4 is an example time sequence diagram, in accordance with various embodiments of the present disclosure.
Figure 5:
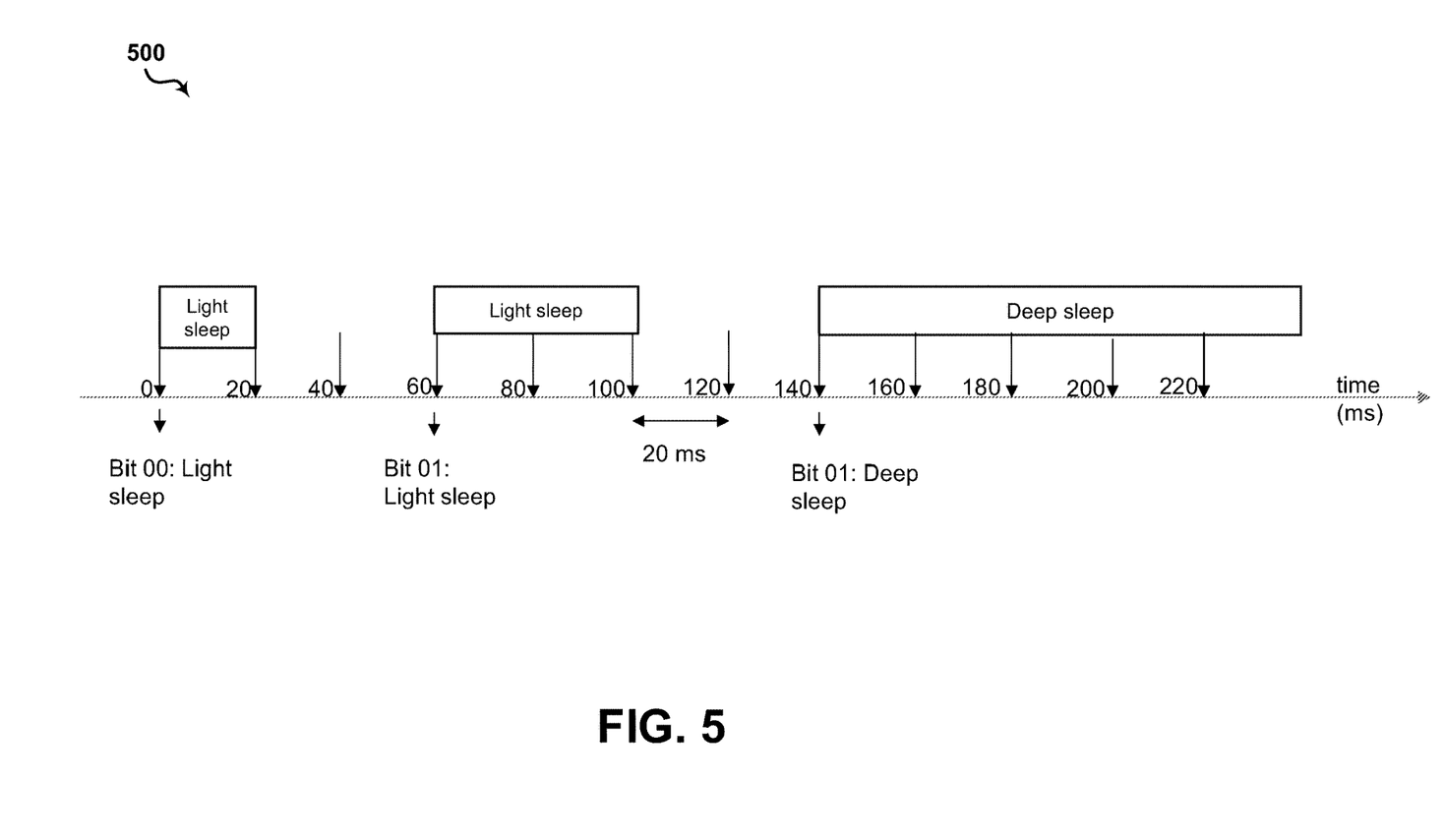
FIG. 5 is an example time sequence diagram, in accordance with various embodiments of the present disclosure.

FIGS. 4 and 5 illustrate example timelines 400 and 500, respectively, where the monitoring periodicity is 20 ms, for example. In FIG. 4, at time 0 ms, the light sleep mode is indicated for a duration of 20 ms. The deep sleep mode is indicated at time 60 ms for a duration of 100 ms. In FIG. 5, the light sleep mode for a duration of 40 ms is indicated at time 60 ms, the deep sleep mode of at least 80 ms is indicated at time 140 ms. In FIGS. 4 and 5, when one of the sleep modes is indicated, the UE may not perform monitoring for the duration of the indicated sleep mode.

In some embodiments, when the UE is checking at a fixed periodicity, a DTX cycle may be activated at certain discrete time instances. For example, one out of at least two cycles may be activated at a given time, and which cycle is activated may be indicated to the UE.

In some embodiments, the sleep mode may be indicated with an index to a sleep mode configuration, and for how long the indicated configuration may be valid. A configuration may include at least one sleep mode and duration for that sleep mode. For example, L stands for the light sleep mode, D stands for the deep sleep mode, and R stands for a regular operation mode (e.g., non-energy saving mode). Furthermore, the durations for the sleep modes may be 20 ms for L and R, and 100 ms for D. As an example, the DCI may indicate one of the following indices with two bits as follows:

Index 0: LLLDDLL
Index 1: DDLLLLL
Index 2: LLLLLLLLLLD
Index 3: RRRRRDD

In the above example, the total duration of each configuration is 300 ms. The UE may monitor the PDCCH at certain monitoring occasions to receive the index to one of the configurations. The indicated configuration may be activated a fixed or predefined delay after the monitoring occasion. In some embodiments, a configuration of a particular mode may include the state and a duration. For example, the modes L and M may stand for "light sleep for 20 ms" and "light sleep for 40 ms", respectively. In some embodiments, the duration for each state may be indicated separately. For example, 8 bits may be used to indicate up to 256 configurations including R, L, D and 1 bit (2 bits) may be used to indicate up to 2 (4) possible durations for the states. As an example, with 1 bit, one out of the following two combinations of durations may be indicated: Duration set 1: {D: 100 ms, L: 20 ms, R: 20 ms}: Duration set 2: {D: 200 ms, L: 40 m, R: 20 ms}.

In some embodiments, when the index is used to indicate a particular configuration, a type of DTX cycle (e.g., long cycle, short cycle), and the time interval of each cycle may be activated over a fixed or predefined duration and may be indicated to the UE. A common PDCCH (e.g., cell-common, or UE-common) may be used.

Figure 6:
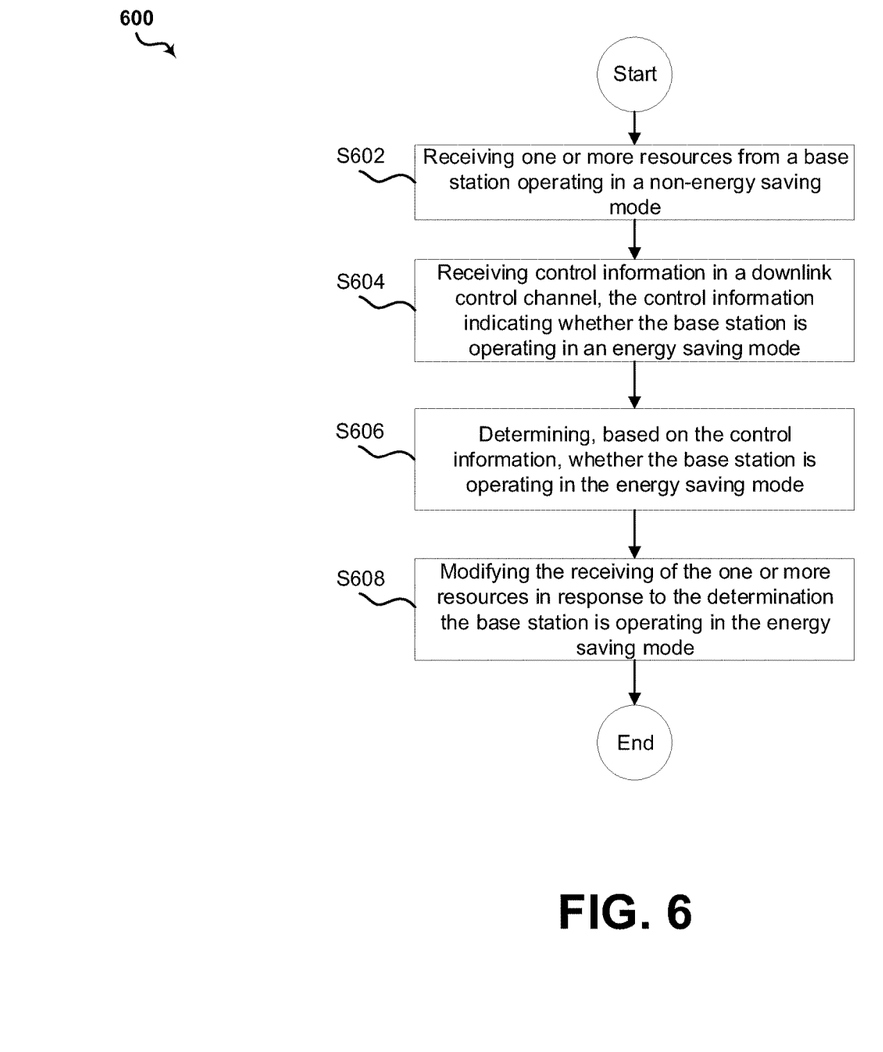
FIG. 6 illustrates a flow chart of an example network energy saving state indication process, in accordance with various embodiments of the present disclosure.

In some embodiments, the sleep mode may include more modes other than the "light sleep mode" and the "deep sleep mode." For example, different common channels may carry different levels of energy, where the periodicity of a subset of these channels may be changed independently depending on use cases to save energy. In some embodiments, each mode may include one, or a subset or a plurality of common channels with respective periodicities. For example, multiple sleep modes (SM) may be defined as follows:

SM0: bits 000: SSB has periodicity of 20 ms
SM1: bits 001: SSB has periodicity of 50 ms
SM2: bits 010: RMS-I has periodicity of 20 ms
SM3: bits 011: RMS-I has periodicity of 50 ms
SM4: bits 100: CSI-RS has periodicity of 20 ms
SM5: bits 101: CSI-RS has periodicity of 50 ms
SM6: bits 110: SSB and CSI-RS has periodicity of 20 ms
SM7: bits 111: SSB and CSI-RS has periodicity of 50 ms FIG. 6 illustrates a flow chart of an embodiment of a network energy saving state indication process 600 performed at a UE. The process may start at operation S602 where one or more resources from a base station (e.g., gNB) are received. The resources may correspond to channels that transmit information to the UE and/or signals such as SSBs, RMSI, CSI-RS, etc. The process proceeds to operation S604 where information in a downlink control channel including information regarding whether the base station is operating in an energy saving mode is received.

The process proceeds to operation S606, where based on the control information, it is determined whether the base station is operating in the energy saving mode. For example, based on an indicator included in the control information along with a specific interval at which the indicator is received (e.g., FIG. 3) it is determined whether the base station is operating in an energy saving mode including one of a plurality of sleep modes. As another example, based on the presence of the indicator including one or more bits (e.g., FIGS. 4 and 5), it is determined whether the base station is operating in an energy saving mode including one of the plurality of sleeping modes.

The process proceeds to operation S608, where in response to the determination the base station is operating in the energy saving mode, the UE modifies the receiving of the one or more resources. For example, in response to determining the base station is operating in one of the plurality of sleep modes for a specific duration, the UE may deactivate the monitoring of the one or more channels and/or signals during the specific duration. The process 600 may terminate after operation S608.

Figure 7:
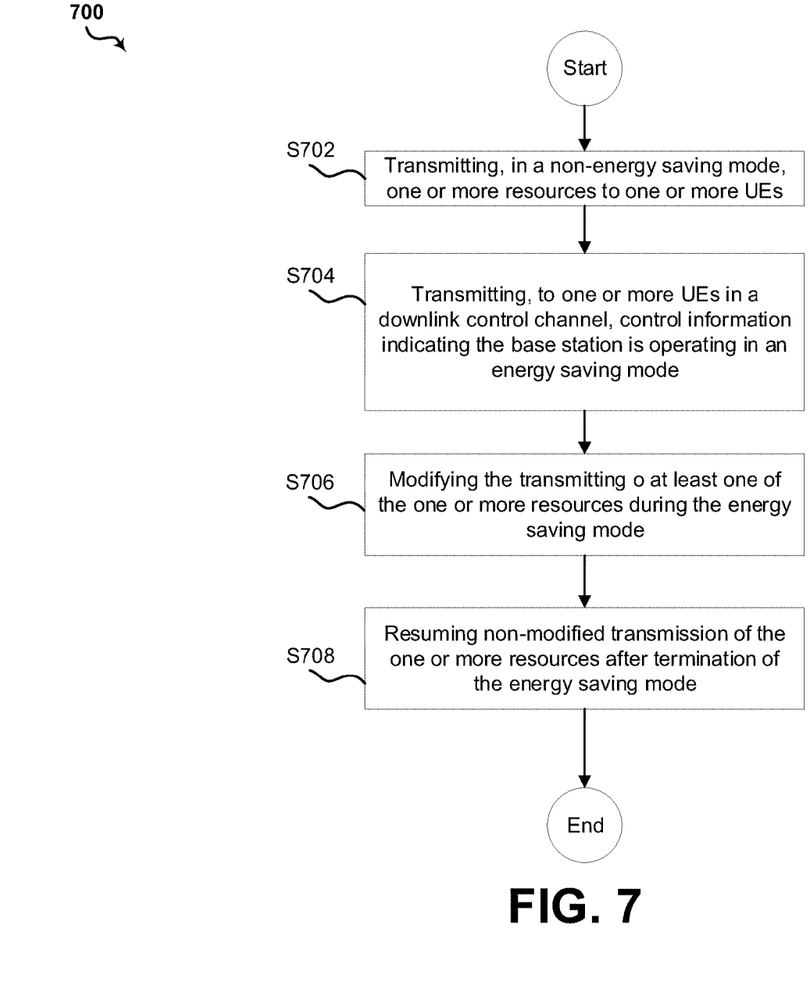
FIG. 7 illustrates a flow chart of an example network energy saving state indication process, in accordance with various embodiments of the present disclosure.

FIG. 7 illustrates a flow chart of an embodiment of a network energy saving state indication process 700 performed at a base station (e.g., gNB). The process may start at operation S702 where the base station, operating in a non-energy saving mode, transmits one or more resources to one or more UEs. The one or more resources may correspond to the one or more resources described with respect to operation S602. The process proceeds to operation S704, where the base station transmits, to the one or more UEs in a downlink control channel, control information indicating the base station is operating in an energy saving mode.

The process proceeds to operation S706 where the base station modifies the transmitting of least one of the one or more resources during the energy saving mode. For example, during the energy saving mode, the base station may deactivate the transmission of information on one or more channels. As another example, during the energy saving mode, the base station may transmit information on one or more data channels with reduced periodicity. The process proceeds to operation S708 where non-modified transmission of the one or more resources is resumed after the energy saving mode is terminated. For example, after the duration of the energy saving mode is completed, the base station may reactivate any deactivated channels or resume transmission of information with regular periodicity. The process 700 may terminate after operation S708.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor in a user equipment (UE), the method including: receiving one or more resources from a base station operating in a non-energy saving mode: receiving, from the base station, control information including in a downlink control channel, the control information indicating whether the base station is operating in an energy saving mode: determining, based on the control information, whether the base station is operating in the energy saving mode: and modifying the receiving of the one or more resources in response to a determination the base station is operating in the energy saving mode.

(2) The method of feature (1), in which the modifying the receiving of the one or more resources includes (i) deactivating monitoring of at least one channel in which data or signaling information is transmitted from the base station to the UE or (ii) receiving the one or more resources with reduced periodicity.

(3) The method of feature (2), in which the energy saving mode includes a plurality of sleep modes including at least a first sleep mode and a second sleep mode, in which in response to a determination the base station is in the first sleep mode, the modifying the receiving of the one or more resources includes deactivating a larger number of channels or receiving the one or more resources with a larger reduction in periodicity than the second sleep mode.

(4) The method of feature (3), in which the base station is determined to be operating in the first sleep mode in response to a determination the control information indicates the energy saving mode is active, and the control information is received at a first time interval, and in which the base station is determined to be operating in the second sleep mode in response to a determination the control information indicates the energy saving mode is active, and the indication is received at a second time interval that is less than the first time interval.

(5) The method according to feature (3) or (4), in which the base station is determined to be operating in the energy saving mode in response to a determination the control information includes an indicator that the energy saving mode is active.

(6) The method of feature (5), in which the base station is determined to be operating in the non-energy saving mode in response to a determination the control information does not include the indicator.

(7) The method according to feature (5) or (6), in which the indicator includes one or more bits that indicates (i) one of the plurality of sleep modes, and (ii) a duration in which the energy saving mode remains active.

(8) The method of feature (7), in which the one or more bits of the indicator includes at least a first bit that indicates the one of the plurality of sleep modes and at least a second bit that indicates the duration in which the energy saving mode remains active.

(9) The method according to any one of features (3)-(8), in which the control information specifies one of a plurality of indexes, each index associated with a separate configuration that indicates a state of operation of the base station and a duration of the state of the operation of the base station, in which the state of operation of the base station indicates whether the base station is operating in one of the plurality of sleep modes or the non-energy saving mode.

(10) The method of feature (9), in which each configuration specifies a plurality of state of operations of the base station as a sequence.

(11) The method according to any one of features (2)-(10), in which the control information specifies one of a plurality of operating modes, each mode specifying at least one of a plurality of signals and a duration of operation, each signal carrying a different level of energy.

(12) The method according to any one of features (2)-(11), in which the plurality of signals include synchronization signal block (SSB), remaining minimum system information (RMS-I), and channel state information reference signal (CSI-RS).

(13) A user equipment (UE) includes: at least one memory configured to store computer program code: and at least one processor configured to access said at least one memory and operate as instructed by said computer program code, said computer program code including: first receiving code configured to cause at least one of said at least one processor to receive one or more resources from a base station operating in a non-energy saving mode, second receiving code configured to cause at least one of said at least one processor to receive, from the base station, control information including in a downlink control channel, the control information indicating whether the base station is operating in an energy saving mode, determining code configured to cause at least one of said at least one processor to determine, based on the control information, whether the base station is operating in the energy saving mode, and modifying code configured to cause at least one of said at least one processor to modify the receiving of the one or more resources in response to a determination the base station is operating in the energy saving mode.

(14) The UE of feature (13), in which the modifying code is further configured to cause at least one of said at least one processor to (i) deactivate monitoring of at least one channel in which data or signaling information is transmitted from the base station to the UE or (ii) receive the one or more resources with reduced periodicity.

(15) The UE of feature (14), in which the energy saving mode includes a plurality of sleep modes including at least a first sleep mode and a second sleep mode, in which in response to a determination the base station is in the first sleep mode, the modifying code is further configured to cause at least one of said at least one processor to deactivate a larger number of channels or receiving the one or more resources with a larger reduction in periodicity than the second sleep mode.

(16) The UE of feature (15), in which the base station is determined to be operating in the first sleep mode in response to a determination the control information indicates the energy saving mode is active, and the control information is received at a first time interval, and in which the base station is determined to be operating in the second sleep mode in response to a determination the control information indicates the energy saving mode is active, and the indication is received at a second time interval that is less than the first time interval.

(17) The UE of feature (15) or (16), in which the base station is determined to be operating in the energy saving mode in response to a determination the control information includes an indicator that the energy saving mode is active.

(18) The UE of feature (17), in which the base station is determined to be operating in the non-energy saving mode in response to a determination the control information does not include the indicator.

(19) The UE of feature (17) or (18), in which the indicator includes one or more bits that indicates (i) one of the plurality of sleep modes, and (ii) a duration in which the energy saving mode remains active.

(20) A non-transitory computer readable medium having instructions stored therein, which when executed by a processor cause the processor to execute a method performed in a user equipment (UE), the method including: receiving one or more resources from a base station operating in a non-energy saving mode; receiving, from the base station, control information including in a downlink control channel, the control information indicating whether the base station is operating in an energy saving mode; determining, based on the control information, whether the base station is operating in the energy saving mode; and modifying the receiving of the one or more resources in response to a determination the base station is operating in the energy saving mode.

What is claimed is:

1. A method performed by at least one processor in a user equipment (UE), the method comprising:
    receiving one or more resources from a base station operating in a non-energy saving mode;
    receiving, from the base station, control information including in a downlink control channel, the control information indicating whether the base station is operating in an energy saving mode;
    determining, based on the control information, whether the base station is operating in the energy saving mode; and
    modifying the receiving of the one or more resources in response to a determination the base station is operating in the energy saving mode,
    wherein the energy saving mode includes a plurality of sleep modes including at least a first sleep mode and a second sleep mode,
    wherein the control information indicates at least one of the plurality of sleep modes that the base station is to operate in, and
    wherein:
        the control information indicates the first sleep mode based on the control information being received at a first monitored search space having a first predetermined time periodicity, and indicates the second sleep mode based on the control information being received at a second monitored search space having a second predetermined time periodicity that is less than the first predetermined time periodicity, or
        the control information includes one of a plurality of predetermined indexes, each predetermined index associated with a separate configuration that specifies plural sleep modes of the base station as a sequence in which the base station is to sequentially operate in the plural sleep modes.

2. The method of claim 1, wherein the modifying the receiving of the one or more resources includes (i) deactivating monitoring of at least one channel in which data or signaling information is transmitted from the base station to the UE or (ii) receiving the one or more resources with reduced periodicity.

3. The method of claim 2,
    wherein in response to a determination the base station is in the first sleep mode, the modifying the receiving of the one or more resources includes deactivating a larger number of channels or receiving the one or more resources with a larger reduction in periodicity than the second sleep mode.

4. The method of claim 3,
    wherein the base station is determined to be operating in the first sleep mode in response to a determination the control information indicates the energy saving mode is active, and the control information is received at the first monitored search space having the first predetermined time periodicity, and
    wherein the base station is determined to be operating in the second sleep mode in response to a determination the control information indicates the energy saving mode is active, and the indication is received at the second monitored search space having the second predetermined time periodicity that is less than the first predetermined time periodicity.

5. The method of claim 3,
    wherein the base station is determined to be operating in the energy saving mode in response to a determination the control information includes an indicator that the energy saving mode is active.

6. The method of claim 5,
    wherein the base station is determined to be operating in the non-energy saving mode in response to a determination the control information does not include the indicator.

7. The method of claim 5,
    wherein the indicator includes one or more bits that indicates (i) one of the plurality of sleep modes, and (ii) a duration in which the energy saving mode remains active.

8. The method of claim 7,
wherein the one or more bits of the indicator includes at least a first bit that indicates the one of the plurality of sleep modes and at least a second bit that indicates the duration in which the energy saving mode remains active.

9. The method of claim 3,
wherein the control information includes one of the plurality of indexes, each index associated with a separate configuration that indicates a state of operation of the base station and a duration of the state of the operation of the base station,
wherein the state of operation of the base station indicates whether the base station is operating in one of the plurality of sleep modes or the non-energy saving mode.

10. The method of claim 2, wherein the control information specifies one of a plurality of operating modes, each mode specifying at least one of a plurality of signals and a duration of operation, each signal carrying a different level of energy.

11. The method of claim 10,
wherein the plurality of signals include synchronization signal block (SSB), remaining minimum system information (RMS-I), and channel state information reference signal (CSI-RS).

12. The method of claim 1, wherein the modifying the receiving of the one or more resources comprises modifying the receiving of the one or more resources after a predetermined delay interval from when the control information is received.

13. A user equipment (UE) comprising:
at least one memory configured to store computer program code; and
at least one processor configured to access said at least one memory and operate as instructed by said computer program code, said computer program code including:
first receiving code configured to cause at least one of said at least one processor to receive one or more resources from a base station operating in a non-energy saving mode,
second receiving code configured to cause at least one of said at least one processor to receive, from the base station, control information including in a downlink control channel, the control information indicating whether the base station is operating in an energy saving mode,
determining code configured to cause at least one of said at least one processor to determine, based on the control information, whether the base station is operating in the energy saving mode, and
modifying code configured to cause at least one of said at least one processor to modify the receiving of the one or more resources in response to a determination the base station is operating in the energy saving mode,
wherein the energy saving mode includes a plurality of sleep modes including at least a first sleep mode and a second sleep mode,
wherein the control information indicates at least one of the plurality of sleep modes that the base station is to operate in, and
wherein:
the control information indicates the first sleep mode based on the control information being received at a first monitored search space having a first predetermined time periodicity, and indicates the second sleep mode based on the control information being received at a second monitored search space having a second predetermined time periodicity that is less than the first predetermined time periodicity, or
the control information includes one of a plurality of predetermined indexes, each predetermined index associated with a separate configuration that specifies plural sleep modes of the base station as a sequence in which the base station is to sequentially operate in the plural sleep modes.

14. The UE of claim 13, wherein the modifying code is further configured to cause at least one of said at least one processor to (i) deactivate monitoring of at least one channel in which data or signaling information is transmitted from the base station to the UE or (ii) receive the one or more resources with reduced periodicity.

15. The UE of claim 14,
wherein in response to a determination the base station is in the first sleep mode, the modifying code is further configured to cause at least one of said at least one processor to deactivate a larger number of channels or receiving the one or more resources with a larger reduction in periodicity than the second sleep mode.

16. The UE of claim 15,
wherein the base station is determined to be operating in the first sleep mode in response to a determination the control information indicates the energy saving mode is active, and the control information is received at the first monitored search space having the first predetermined time periodicity, and
wherein the base station is determined to be operating in the second sleep mode in response to a determination the control information indicates the energy saving mode is active, and the indication is received at the second monitored search space having the second predetermined time periodicity that is less than the first predetermined time periodicity.

17. The UE of claim 15,
wherein the base station is determined to be operating in the energy saving mode in response to a determination the control information includes an indicator that the energy saving mode is active.

18. The UE of claim 17,
wherein the base station is determined to be operating in the non-energy saving mode in response to a determination the control information does not include the indicator.

19. The UE of claim 17,
wherein the indicator includes one or more bits that indicates (i) one of the plurality of sleep modes, and (ii) a duration in which the energy saving mode remains active.

20. A non-transitory computer readable recording medium having instructions stored therein, which when executed by a processor cause the processor to execute a method performed in a user equipment (UE), the method comprising:
receiving one or more resources from a base station operating in a non-energy saving mode;
receiving, from the base station, control information including in a downlink control channel, the control information indicating whether the base station is operating in an energy saving mode;
determining, based on the control information, whether the base station is operating in the energy saving mode; and
modifying the receiving of the one or more resources in response to a determination the base station is operating in the energy saving mode, wherein the energy saving mode includes a plurality of sleep modes including at least a first sleep mode and a second sleep mode,
wherein the control information indicates at least one of the plurality of sleep modes that the base station is to operate in, and
wherein:
   the control information indicates the first sleep mode based on the control information being received at a first monitored search space having a first predetermined time periodicity, and indicates the second sleep mode based on the control information being received at a second monitored search space having a second predetermined time periodicity that is less than the first predetermined time periodicity, or
the control information includes one of a plurality of predetermined indexes, each predetermined index associated with a separate configuration that specifies plural sleep modes of the base station as a sequence in which the base station is to sequentially operate in the plural sleep modes.

\* \* \* \* \*